Oct. 3, 1939.   B. KAHN   2,174,981
CONNECTING ROD BEARING ASSEMBLY FOR INTERNAL COMBUSTION ENGINES
Original Filed March 3, 1934   6 Sheets-Sheet 4
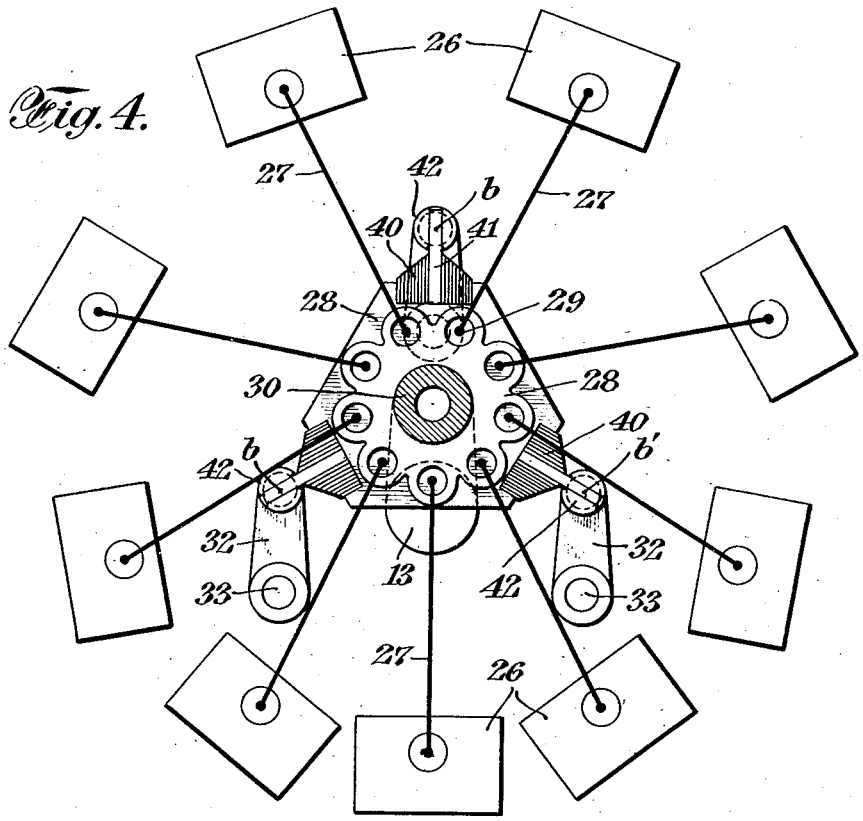
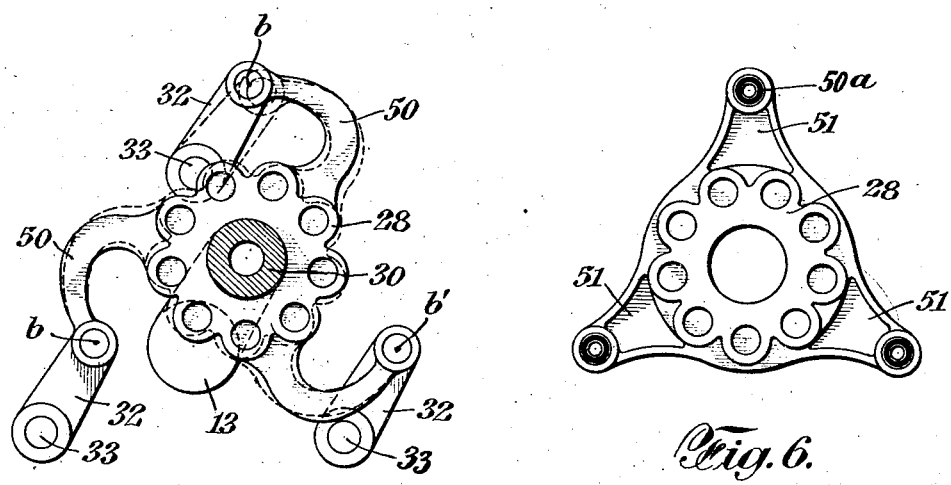
INVENTOR
*Benjamin Kahn*
BY
*Earl W. Hastings*
ATTORNEY

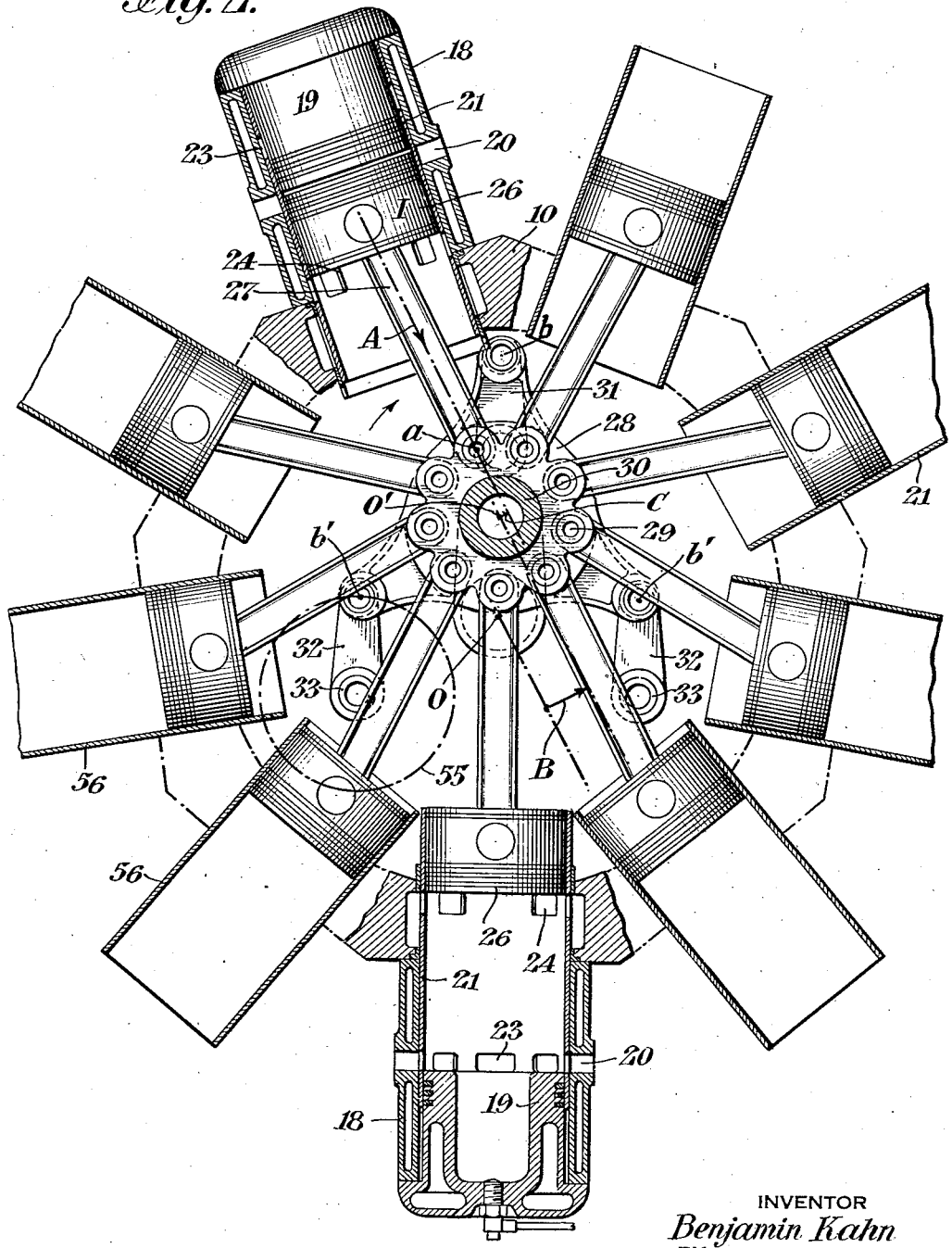

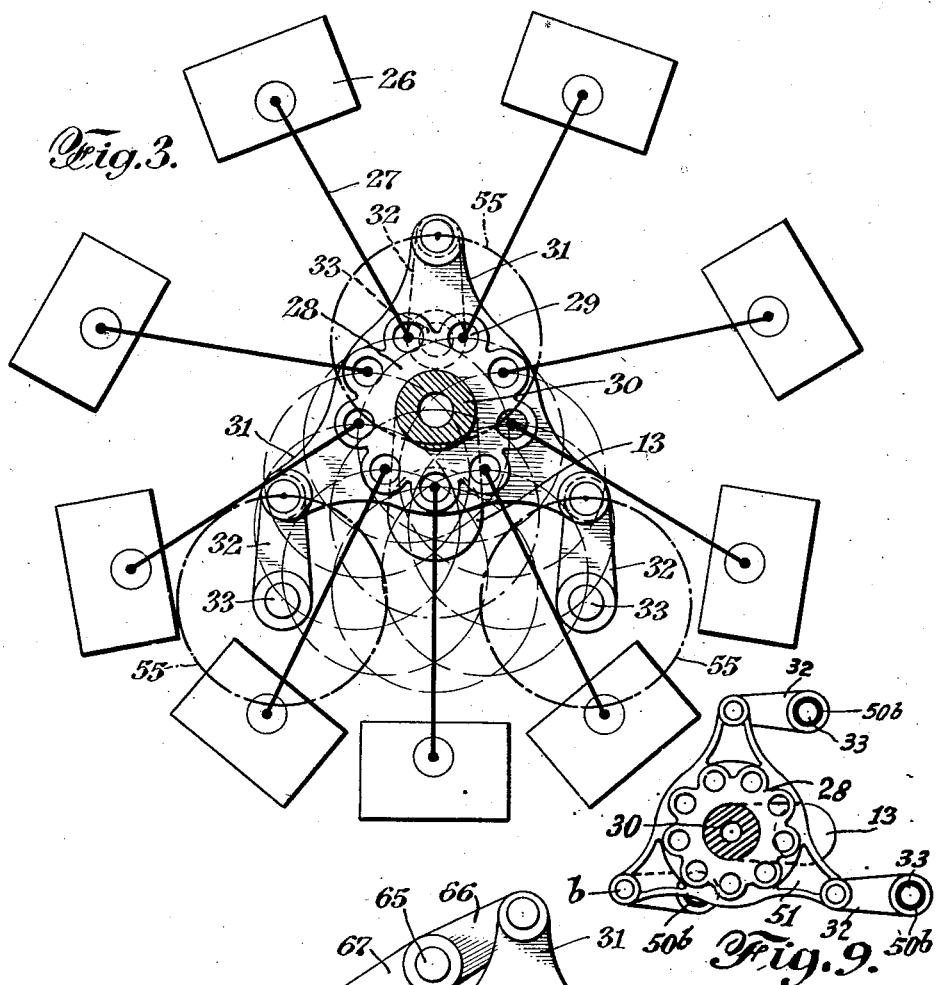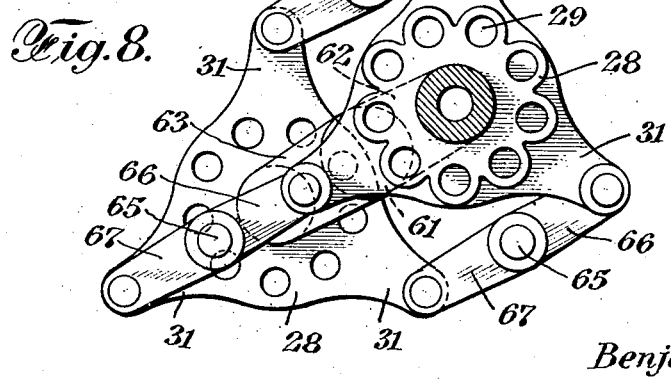

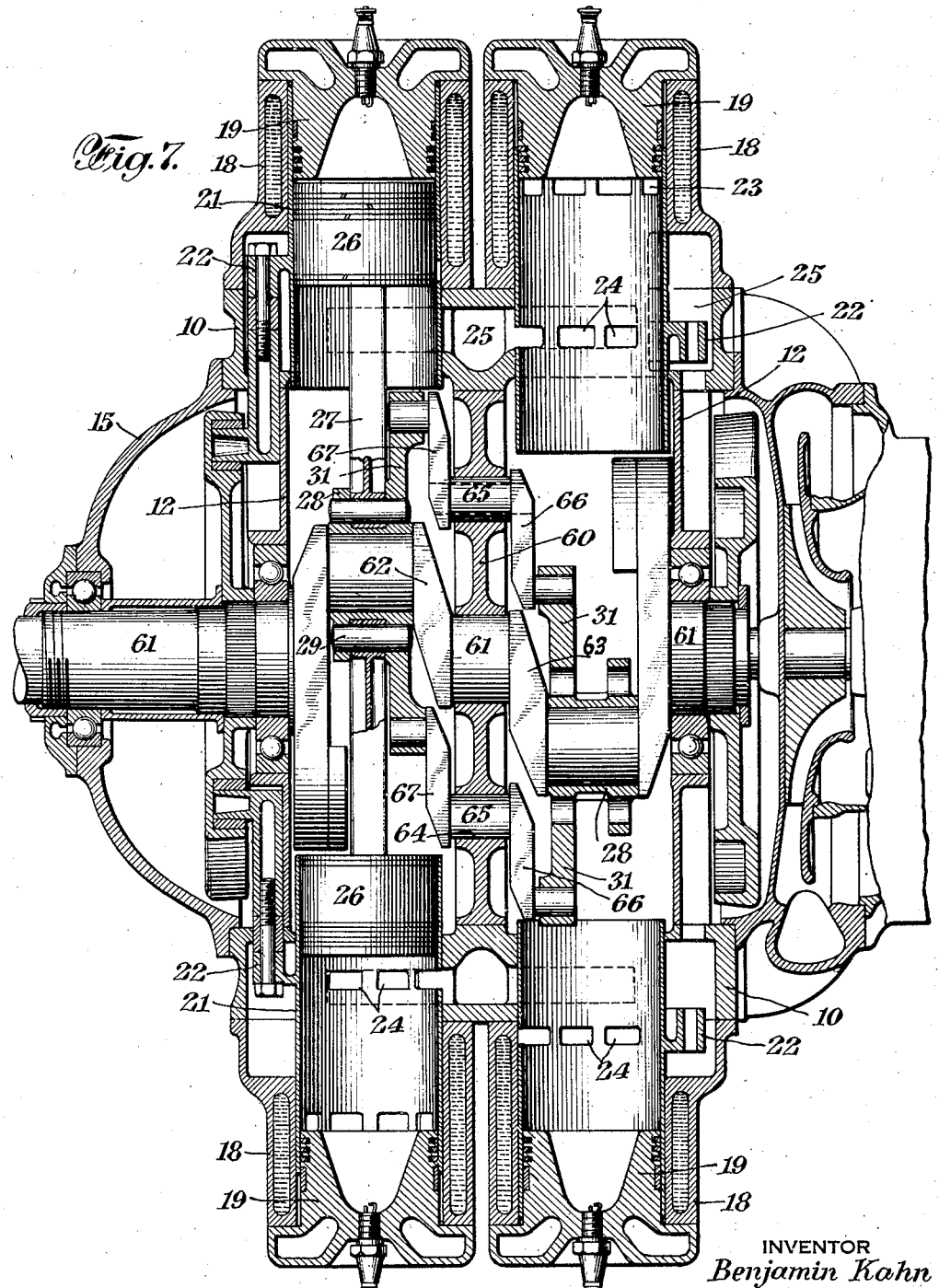

Oct. 3, 1939.  B. KAHN  2,174,981
CONNECTING ROD BEARING ASSEMBLY FOR INTERNAL COMBUSTION ENGINES
Original Filed March 3, 1934  6 Sheets—Sheet 6
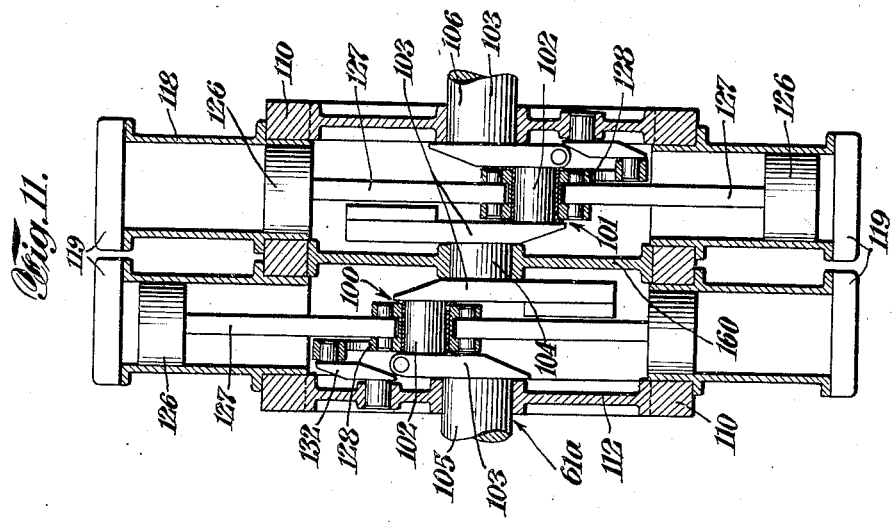
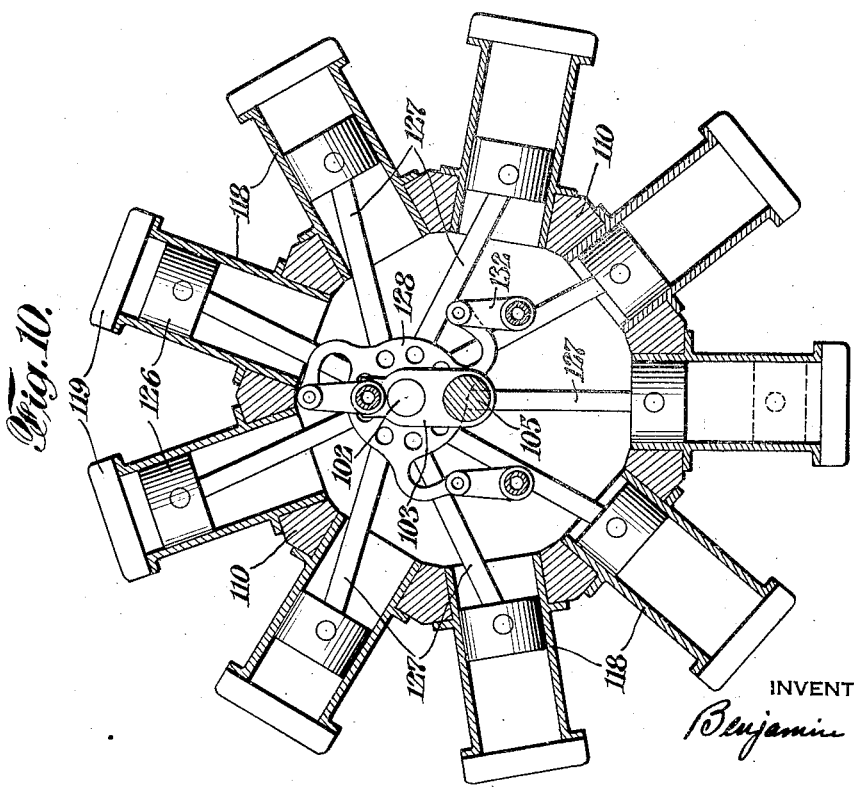
INVENTOR
Benjamin Kahn Patented Oct. 3, 1939

2,174,981

UNITED STATES PATENT OFFICE 2,174,981

CONNECTING ROD BEARING ASSEMBLY FOR INTERNAL COMBUSTION ENGINES

Benjamin Kahn, New York, N. Y., assignor to Kinetic Cycle Research Corporation, New York, N. Y., a corporation of New York Application March 3, 1934, Serial No. 713,822
Renewed September 29, 1938

15 Claims. (Cl. 121—120)

This invention relates to radial internal combustion engines particularly to masterless connecting-rod power transmitting mechanism for internal combustion engines of high output and high compression ratio requirements.

One of the main objects of the invention is to provide engines of the type described wherein the peaks of the explosion loads are dampened prior to their effect on the crankshaft, thereby greatly diminishing the stresses and strains of resulting shock in the crankshaft and cranktrain.

Another object of the invention is to provide such an engine wherein the dampening loads or forces are reduced by leverage.

Another object is to provide an engine of the character described wherein the detrimental effects resulting from manufacturing inaccuracies, heat expansion and crankshaft load distortions are minimized.

Another object is to provide means for accomplishing the above in conjunction with radial engine of relatively small outside diameter.

Broadly the invention consists in providing a connecting rod bearing around the crankpin which is adapted to move therewith. This bearing while free to move with the crankpin around the crankshaft center, is provided with auxiliary cranks pivoted to the crankcase to prevent rotation of the bearing around the crankpin. This bearing is further adapted to oscillate around its center concentric with the crankpin center during the crankshaft rotation. Yieldable means are provided in the train of parts to permit said oscillation of the crankpin bearing. This yieldable means is preferably located between the crankpin bearing and the crankcase to which it is operably connected. This yieldable means cooperates with the connecting rod bearing to permit the peak explosion loads of the pistons to be received and dampened therein. This construction in cooperation with means for transmitting power directly from the crankpin to both ends of the crankshaft without the use of intermediate power transmitting gears is another feature of the invention.

The invention further consists in providing extensions on this connecting rod bearing which are adapted to reduce the reacting loads of its turning moment around the crankpin center by mechanical leverage.

Another object is to produce an efficient engine of the character described.

Other objects and advantages will be apparent from the description read in connection with the accompanying drawings, wherein:

Figure 2 is a section taken substantially on the line 2—2 of Fig. 1, with some of the parts broken and other parts removed.

Figure 3 is a diagrammatic face view of the engine shown in Figs. 1 and 2 showing the crank train.

Figure 4 is a similar diagrammatic face view of a modified form of the invention, showing resilient means in the crank train.

Figures 5 and 6 are modified forms of connecting rod bearings shown in Fig. 4.

Figure 7 is a longitudinal section of an engine similar to that shown in Fig. 1, except, two banks of power units are provided.

Figure 8 is a fragmentary detail of the connecting rod bearings as used in the engine of Fig. 7.

Figure 9 is a fragmentary detail of a modified form of the invention.

Figure 10 is a section transverse to the crankshaft of an engine having embodied therein the modification shown in Figure 5.

Figure 11 is a section substantially on the line 11—11 of Figure 10, showing a double bank engine with the modification shown in Figure 5 embodied therein.

Figure 1:
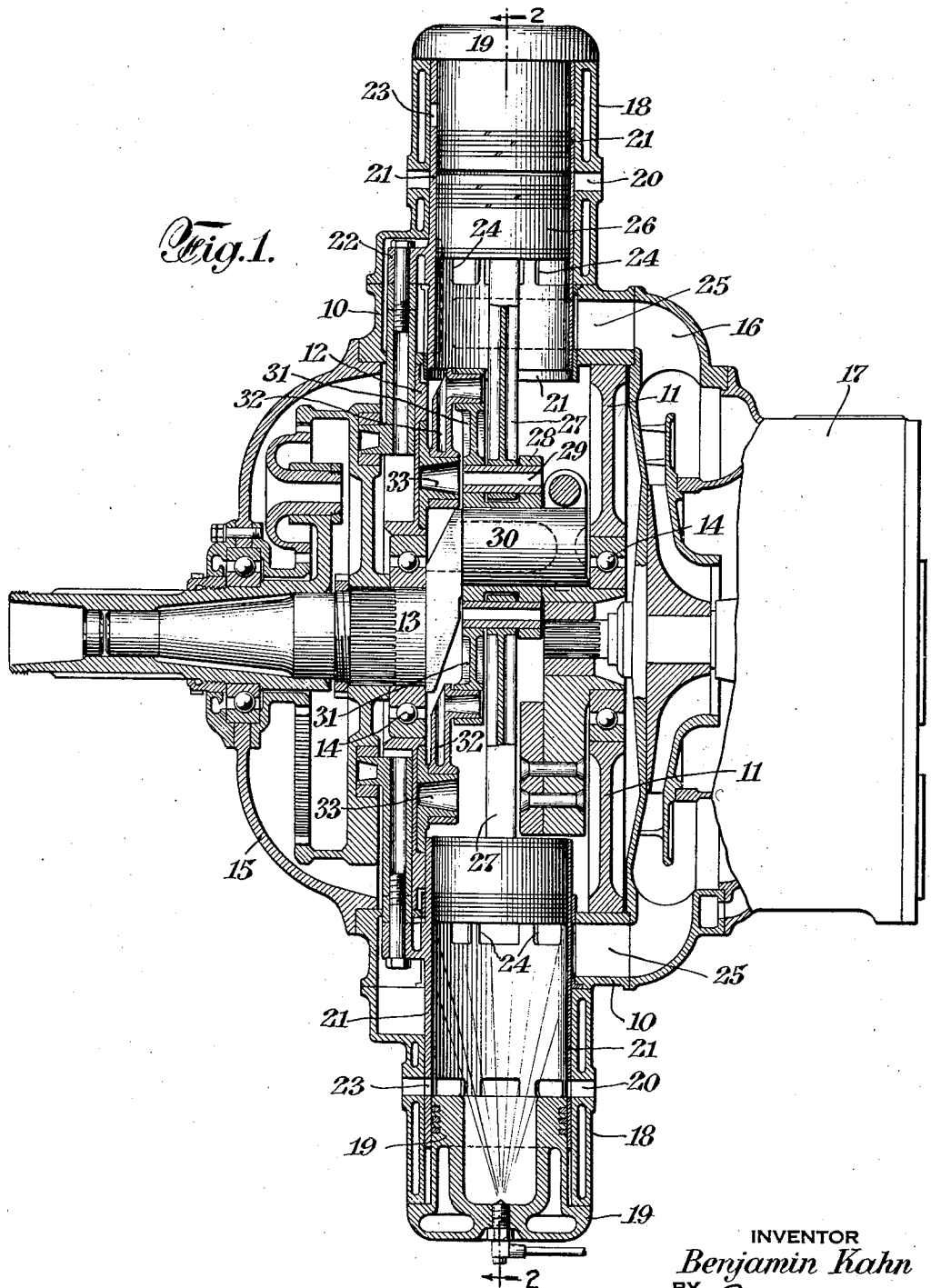
Figure 1 is a longitudinal central section of a radial engine of a single bank type, embodying the invention.

In Fig. 1, the engine shown comprises a crankcase 10 having crankcase walls 11 and 12, adapted to receive a crankshaft 13 having a power output portion in each of the main bearings 14 in the opposing walls of the crankcase. The crankcase is provided with a nose section 15 and a supercharge housing 16. Secured rearward of the housing 16 is a rear housing 17 for accessory driving mechanism.

Secured around the crankcase 10 are a plurality of cylinders 18, each provided with a cylinder head 19. Exhaust ports 20 are provided in the cylinder. Adapted to operate in the cylinder and the crankcase, is a sleeve 21, provided with an extension 22 at one side of the sleeve outside the crankcase. Ports 23 in the sleeve are adapted to cooperate with ports 20 in the cylinder to control the exhaust. Ports 24 in the sleeve are adapted to cooperate with gas passages 25 in the crankcase. A piston 26 is adapted to reciprocate in the sleeve and is further adapted to control the inlet ports 24.

The pistons 26 are suitably secured to connecting rods 27 in the usual manner. These rods are all identical and are of the articulated type. The inner ends of the rods are linked to a connecting rod bearing 28 by means of pins 29. This bearing is adapted to cooperably receive a crankpin 30 which is connected by crankcheeks at the ends thereof, to the power output portions of the crankshaft. Extending arms 31 are provided on the bearing member 28 and are adapted to be linked at their outer ends to cranks 32. These cranks are adapted to rotate on stubs 33 anchored in the crankcase diaphragm 12. The throws of the cranks 32 are equal to the throw of the crankshaft 13. The cranks are so arranged as to be substantially radially parallel to the crankthrow of the crankshaft 13.

With reference to Fig. 2 it will be seen that a force A of piston 1 effects two turning moments. One moment is around the crankshaft center O with the arm equal to B. The other moment tends to turn the bearing 28 around the crankpin center O' with an arm length C. Therefore it is seen that the force A is resolved in engine torque, A times B, and in connecting rod bearing torque, A times C. Moment AC of the bearing is applied at $a$ which is located as close to its fulcrum O' as the diameter of the crankpin will permit. Moment AC is resisted at $b$—$b'$ through cranks 32. The points $b$ and $b'$ are at a greater distance from the fulcrum O' than the point $a$. It is desirable to have these points $b$—$b'$ as far from the center O' as the design will permit.

It is therefore obvious that the reacting load at $b$ and $b'$ is to force at $a$ in substantially inverse ratio as the distance $bO'$ is to C.

Due to this leverage a mechanical advantage is had and small loads are received in the crankcase as well as the extension 31 and the cranks 32, which permits these parts to be made of light construction.

During the working cycle it is known that the force A is not a constant force but is subject to great fluctuations due to the gas and inertia loads. It is desirable to prevent the transmission of peaks of the fluctuating forces from harmfully effecting the crankshaft. To this end the connecting rod bearing 28 is suspended in the stationary stubs 33 by providing resilient means between the points of suspension 33 and the force application points $a$ as seen in Figs. 4, 5 and 6.

In Fig. 4 the resilient means comprises flat springs 40 on both sides of an arm 41. The inner ends of the springs 40 and arm 41 are suitably supported in the connecting rod bearing 28. The outer ends of the arm 41 are adapted to cooperate with the cranks 32 by interposing a rotatable bushing 42 on the cranks 32 having slots cooperating with arms 41.

In Fig. 5 the resilient means are provided by flexible extensions 50 of the connecting rod bearing 28, and are connected at their outer ends to the cranks 32.

In Fig. 6 the resilient means may be rubber bushings 50a or the like between the extension 51 of the bearing 28, and the cranks 32.

Other forms of resilient means may be provided such floating bushings, or the like, and resilient means may be incorporated to cooperate with the cranks 32, or with the stubs 33, as shown at 50b in Fig. 9.

Referring to Figs. 2 and 3 it will be apparent that the travel path 55 of the crank 32 is encroached by the pistons, and clears the crankcase.

This is possible by employing sleeves 56 to cooperate with the pistons. The sleeve movements being in such timed relation to the cranks 32, that they clear the path 55 by moving into the cylinders as the cranks 32 approach.

In Figs. 7 and 8, the invention is shown as applied to a double bank radial engine. A central crankcase web 60 is adapted to provide a bearing for the crankshaft 61 between the crankthrows 62 and 63. The web is further adapted to provide bearings 64 for a dual crank member 65 having two throws 66 and 67 arranged one on each side of the web. These members 65 are adapted to cooperate with the connecting rod bearings as heretofore described.

Referring to Figs. 10 and 11, the crankshaft 61a is provided with crankthrows 100 and 101 each including a crankpin 102 connected at its ends by crankcheeks 103. The inner crankcheeks are joined to a coaxial bearing portion 104 of the power output portions 105 and 106. It is of course understood that in a single bank engine the portion 104 of the crankshaft becomes the rear power output portion of the crankshaft. The crankcase 110 is provided with two banks of cylinders 118 having cylinder heads 119 closing the outer end of the cylinders. Pistons 126 are adapted to reciprocate in the cylinders and are connected by means of identical articulated connecting rods 127 to the bearing member 128 which is substantially identical to the bearing member 28 shown in Figure 5, and having flexible extensions connected at their outer ends to auxiliary cranks 132. These cranks 132 are suitably journalled in transverse walls 112 integral with the crankcase as seen in Fig. 11 or may be formed of separate discs attached to the crankcase as shown in Fig. 7. A separate or integral transverse wall 160 joined to the crankcase may be provided to form a support and journal for the center portion 104 of the crankshaft.

Although in Fig. 11 the auxiliary cranks are illustrated as rotatable in the end crankcase walls 112, in which case, the counterweights preferably extend from the crankcheeks adjacent the inner crankcase wall 160, it will be seen from Fig. 7 that auxiliary cranks may be mounted in a suitable manner in the center of crankcase wall 160, in which case, the counterweights would be disposed adjacent the outer crankcase walls and extending from the crankcheeks adjacent the outer crankcase walls in the manner illustrated in Fig. 7.

It is to be understood that this disclosure is merely illustrative of the invention and it is to be further understood that various changes and modifications may be made without departing from the spirit and scope thereof as defined in the following claims.

I claim:

1. In an internal combustion engine the combination of a crankcase, power output shafts centrally journalled in the crankcase, a crankcheek on each of the shafts, a crankpin between the cheeks, pistons, identical articulated connecting rods, resilient shock absorbing means including a master crankpin bearing disposed between the crankpin and the crankcase, whereby the master crankpin bearing is adapted to yield and recoil around the crankpin center.

2. An internal combustion engine having in combination, a crankcase, a crankshaft having driving connections at both ends thereof and journalled centrally in the crankcase, pistons, identical articulated connecting rods for the latter, a master crankpin bearing operably associated with the crankshaft and the connecting rods whereby the power of the pistons is transmitted to the crankshaft, and means for dampening the peak loads of the pistons and interposed between the master crankpin bearing and the crankcase, whereby the shocks of the pistons to the crankshaft are reduced.

3. A radial engine having in combination, a power output crankshaft, a crankcase, a crankpin on the crankshaft, pistons, identical articulated connecting rods adapted to operate the crankshaft, annularly movable and oscillating means having operating connection with the crankpin, the connecting rods, and the crankcase for dampening the peak loads of the pistons.

4. An internal combustion engine including a crankcase having walls, cylinders thereon, pistons in the cylinders, centrally disposed shafts having coaxial and oppositely extending power output portions journalled in the walls of the crankcase, crankcheeks on the inner ends of the shafts, a crankpin between the crankcheeks, a member journalled on the crankpin, connecting rods between the member and the pistons, auxiliary cranks rotatably mounted in the crankcase and connected to said member, said cranks having no torque transmitting connections with the shafts, said cranks adapted to direct the member in an annular path, pivotal connections between the connecting rods and the member and radially adjacent the crankpin center, and yielding pivotal connections between the member and the auxiliary cranks and radially remote of the first mentioned pivotal connections from the crankpin center for yieldingly reacting to the torque imposed on the member.

5. An internal combustion engine including a crankcase, power receiving shafts in the crankcase, a crankpin integrally connected to said shafts, pistons, identical articulated connecting rods, a member journalled on the crankpin adapted to receive power from the pistons and adapted to drive the crankpin, said member being subject to torque around the crankpin during said driving, and means between the member and the crankcase for yieldingly resisting the torque on said member.

6. In a radial engine the combination of a crankcase, cylinders on the crankcase, pistons adapted to operate in the cylinders, a crankshaft, a crankpin thereon, a crankpin bearing, masterless connecting rod driving means associated with the pistons and bearing, and means associated with the bearing for directing its path, said means including resilient connections between the crankcase and the bearing.

7. In a high output radial internal combustion engine of the masterless connecting rod type, the combination of a crankcase having walls, cylinders on the crankcase, pistons in the cylinders, identical articulated connecting rods associated with the pistons, auxiliary cranks rotatably mounted in the crankcase, a master crankpin bearing connected to the auxiliary cranks whereby the bearing movement is confined in an annular orbit and is prevented from rotating about its own center, pivots in the bearing joining the inner ends of the connecting rods to the bearing, a crankpin in the bearing for receiving motion from the bearing, crankcheeks on the crankpin disposed on each side of the bearing, coaxial shafts on each crankcheek for receiving the power applied to the crankpin, said shafts being journalled and centrally disposed in the walls of the crankcase, whereby the entire power load applied to the crankpin is transmitted to both shafts, and whereby the auxiliary cranks are free of power loads applied to the crankpin, and yieldable means between the bearing and the crankcase whereby the bearing is free to oscillate in response to the loads applied by the pistons to the pivots.

8. In a radial engine the combination of a crankcase, cylinders, pistons in the cylinders, a crankshaft in the crankcase and having a crankpin, connecting rods operably associated with the crankpin and the pistons, a member on the crankpin having pivots for the connecting rods and interposed between the connecting rods and the crankpin, yieldable extensions on the member outward of the pivots, and cranks operably connected to the extensions and the crankcase.

9. In a high output radial internal combustion engine of the masterless connecting rod type, the combination of a crankcase having walls, cylinders on the crankcase, pistons in the cylinders, identical articulated connecting rods associated with the pistons, auxiliary cranks rotatably mounted in the crankcase, a master crankpin bearing connected to the auxiliary cranks, whereby the bearing movement is confined in an annular orbit and is prevented from rotating about its own center, pivots in the bearing joining the inner ends of the connecting rods to the bearing, a crankpin in the bearing for receiving motion from the bearing, crankcheeks on the crankpin on each side of the bearing, coaxial shafts on each crankcheek for receiving the power applied to the crankpin, said shafts being journalled and centrally disposed in the walls of the crankcase, whereby the entire power load applied to the crankpin is transmitted to both shafts, and whereby the auxiliary cranks are free of power loads applied to the crankpin, and flexible extensions on the bearing connected to the auxiliary cranks whereby the bearing is free to oscillate in response to the loads applied by the pistons to the pivots.

10. In a high output internal combustion engine of the masterless connecting rod type, the combination of a crankcase having walls, cylinders on the crankcase, pistons in the cylinders, identical connecting rods associated with the pistons, a master crankpin bearing, pivots in the bearing for joining the inner ends of the connecting rods to the bearing, coaxial shafts centrally disposed in the walls of the crankcase, a crankpin in the bearing, crankcheeks on the crankpin for transmitting the entire power applied to the crankpin to both shafts, flexible extensions on the master crankpin bearing extending outward of the pivots, auxiliary cranks rotatably mounted in the crankcase and connected to the flexible extensions for confining the movement of the bearing in an annular orbit, and for preventing the rotation of the bearing around its own center, said flexible extensions permitting the bearing to oscillate around its own center during shock receiving periods thereby relieving the said shafts of such shock reception.

11. In a radial cylinder internal combustion engine of the masterless connecting rod type, the combination including a stationary crankcase, walls associated with said crankcase, cylinders on the crankcase, pistons in the cylinders, a power output shaft journalled in the center of one of said walls, a crankcheek on said power output shaft and operating in a circular path adjacent said crankcase wall, a second power output shaft journalled in the center of the other of said crankcase walls, a second crankcheek on said second power output shaft, a single crankpin between said crankcheeks and rigidly cooperative with both crankcheeks, a crankpin bearing member mounted on said crankpin and subject to torque therearound, knuckle pins in said bearing member and positioned immediately adjacent the crankpin, identical connecting rods each connected to a piston and a knuckle pin, whereby the power from each piston is transmitted identically to the bearing member with a minimum of torque imposed thereon, light auxiliary cranks subject only to forces reacting to the torque of said bearing member, each of said auxiliary cranks being pivotally mounted at one end to said first mentioned wall only, said cranks adapted to operate in a circular path adjacent said first mentioned wall only, the operating path of said auxiliary cranks overlapping the operating path of said first mentioned crankcheek, and means connecting the free ends of said auxiliary cranks to said bearing member at points radially outward of said knuckle pins.

12. In a radial internal combustion engine of the masterless connecting rod type, the combination including a crankcase, walls associated with the crankcase, cylinders on said crankcase, pistons in said cylinders, a crankshaft having a crankpin, said crankshaft comprising at least two pieces, each piece having a power output shaft portion and a crankcheek, said pieces being separable at the crankpin, a one piece crankpin bearing member mounted on said crankpin and subject to torque therearound, said crankcheeks adapted to operate in circular paths adjacent respective crankcase walls, knuckle pins in said bearing member and positioned immediately adjacent said crankpin, identical connecting rods each connected with a piston and a knuckle pin, whereby power from each of said pistons is transmitted identically to said bearing member with a minimum of torque imposed thereon, light auxiliary cranks subject only to forces reacting to the torque of said bearing member, each of said auxiliary cranks being pivotally mounted at one end to one of said walls of the crankcase only, said cranks adapted to operate in a circular path substantially overlapping the circular path of operation of one of said crankcheeks, and means connecting the free ends of the auxiliary cranks to said bearing member at points radially outward of said knuckle pins.

13. In apparatus for converting reciprocating into rotary motion or vice versa, the combination with three rotary members or crankshafts the axes of which are parallel to one another, are spaced apart, and lie at the edges of a triangular prism, of a coupling member pivotally connected as by a crank pin to each of the thre rotary members at a point which is spaced from the axis of such rotary member so that the rotary members are caused to rotate in synchronism with any point on the coupling member following a circular path, the circles described by the axes of the pivots connecting the coupling member to two of the rotary members overlapping that described by the axis of the pivot connecting the coupling member to the third rotary member and a plurality of connecting rods each pivoted at one end to the coupling member and at its other end to a piston, crosshead or other reciprocating member.

14. A radial engine having in combination a crankcase, a single crankshaft having a plurality of crankpins and centrally disposed power output shaft portions, a plurality of banks of power units adapted to operate with the said crankshaft, each bank of power units comprising equally spaced cylinders on and around the crankcase, pistons adapted to reciprocate in the cylinders, connecting rods operably associated with the crankpin and the pistons, a member interposed between the connecting rods and its associated crankpin, said member having pivots for the connecting rods spaced close to and around said crankpin, extensions on the member and extending outward of the pivots, and cranks rotatably mounted in the crankcase and operably connected to the extensions, the cranks of each bank of power units being interconnected and operable in the same bearing of the crankcase.

15. A radial engine having in combination a crankcase, a single crankshaft having a plurality of crankpins and centrally disposed power output shaft portions, a plurality of banks of power units adapted to operate with one of said crankpins of the said crankshaft, each bank of power units comprising equally spaced cylinders on and around the crankcase, pistons adapted to reciprocate in the cylinders, connecting rods operably associated with the crankpin and the pistons, a member interposed between the connecting rods and its associated crankpin, said member having pivots for the connecting rods spaced close to and around the said crankpin, extensions on the member extending outward of the pivots, and cranks for each bank rotatably mounted in the crankcase and operably connected to the extensions of its associated member.

BENJAMIN KAHN.